(12) United States Patent
Zylinski et al.

(10) Patent No.: US 12,695,242 B2
(45) Date of Patent: Jul. 28, 2026

(54) ELECTRICAL CONNECTOR ASSEMBLY

(71) Applicant: 360 TWO Pty Ltd., Jindabyne (AU)

(72) Inventors: Dan Zylinski, Avonside (AU); Bradley John McCloy, New Hamburg (CA)

(73) Assignee: 360 TWO Pty Ltd., Jindabyne (AU)

( * ) Notice: Subject to any disclaimer, the term of this patent is extended or adjusted under 35 U.S.C. 154(b) by 304 days.

(21) Appl. No.: 18/504,265

(22) Filed: Nov. 8, 2023

(65) Prior Publication Data

US 2024/0154357 A1     May 9, 2024

(51) Int. Cl.
| | |
|---|---|
| *H01R 13/627* | (2006.01) |
| *B62J 6/01* | (2020.01) |
| *H01R 13/641* | (2006.01) |

(52) U.S. Cl.
CPC ............. *H01R 13/627* (2013.01); *B62J 6/01* (2020.02); *H01R 13/641* (2013.01)

(58) Field of Classification Search
CPC ............. H01R 13/627; H01R 13/6272; H01R 13/6275; H01R 13/629; H01R 13/62938; H01R 13/641; B62J 6/01
USPC .................................................. 439/345, 352
See application file for complete search history.

(56) References Cited

U.S. PATENT DOCUMENTS

| | | | | | |
|---|---|---|---|---|---|
| 6,186,819 | B1 * | 2/2001 | Holub | .................. | H01R 13/641 |
| | | | | | 439/358 |
| 6,945,805 | B1 * | 9/2005 | Bollinger | ............... | H01R 39/64 |
| | | | | | 439/348 |
| 7,762,854 | B1 * | 7/2010 | Peng | ...................... | H01R 24/50 |
| | | | | | 439/752 |
| 9,595,788 | B1 * | 3/2017 | Luksic | ............... | H01R 13/6277 |
| 9,680,256 | B1 * | 6/2017 | Lane | .................. | H01R 13/6275 |
| 2007/0059973 | A1 * | 3/2007 | Fabian | ................. | H01R 13/112 |
| | | | | | 439/475 |
| 2007/0155248 | A1 * | 7/2007 | Cairns | .................. | H01R 13/521 |
| | | | | | 439/660 |
| 2014/0127926 | A1 * | 5/2014 | Condo | .............. | H01R 13/6456 |
| | | | | | 439/345 |
| 2014/0273571 | A1 * | 9/2014 | Iyer | ........................ | H01R 13/53 |
| | | | | | 439/485 |
| 2017/0214168 | A1 * | 7/2017 | Schroll | .............. | H01R 13/4365 |
| 2017/0271815 | A1 * | 9/2017 | Lane | ................. | H01R 13/62927 |
| 2018/0123287 | A1 * | 5/2018 | Dietz | ................... | H01R 13/193 |
| 2021/0184399 | A1 * | 6/2021 | Menzies | .............. | H01R 13/506 |
| 2021/0273375 | A1 * | 9/2021 | Johnson | .............. | H01R 13/582 |
| 2023/0299533 | A1 * | 9/2023 | Zheng | ................ | H01R 13/6205 |
| | | | | | 439/39 |

(Continued)

*Primary Examiner* — Tulsidas C Patel
*Assistant Examiner* — Thomas K Quigley
(74) *Attorney, Agent, or Firm* — Sisson & Banyas, Attorneys at Law, LLC; Edwin A. Sisson

(57)     ABSTRACT

An electrical connector assembly is provided comprising a male connector having an insertion end with a latch-receiving channel and an electrical contact arrangement, and a female connector having an open receiving end housing a movable member. The movable member includes a forwardly projecting gate and a complementary electrical contact arrangement and is biased toward the receiving end by a biasing arrangement. A locking member having a latch portion cooperates with the gate to hold the latch captive in a forwardly biased state. Upon insertion of the male connector, continued movement retracts the movable member, freeing the latch to engage the latch-receiving channel and lock the connectors together.

15 Claims, 12 Drawing Sheets

(56) References Cited

U.S. PATENT DOCUMENTS

2023/0335935 A1* 10/2023 Johnson ............... H01R 13/641
2024/0339785 A1* 10/2024 Plessis ............. H01R 13/62927
2025/0047037 A1* 2/2025 Brandt ............... H01R 13/6315

* cited by examiner

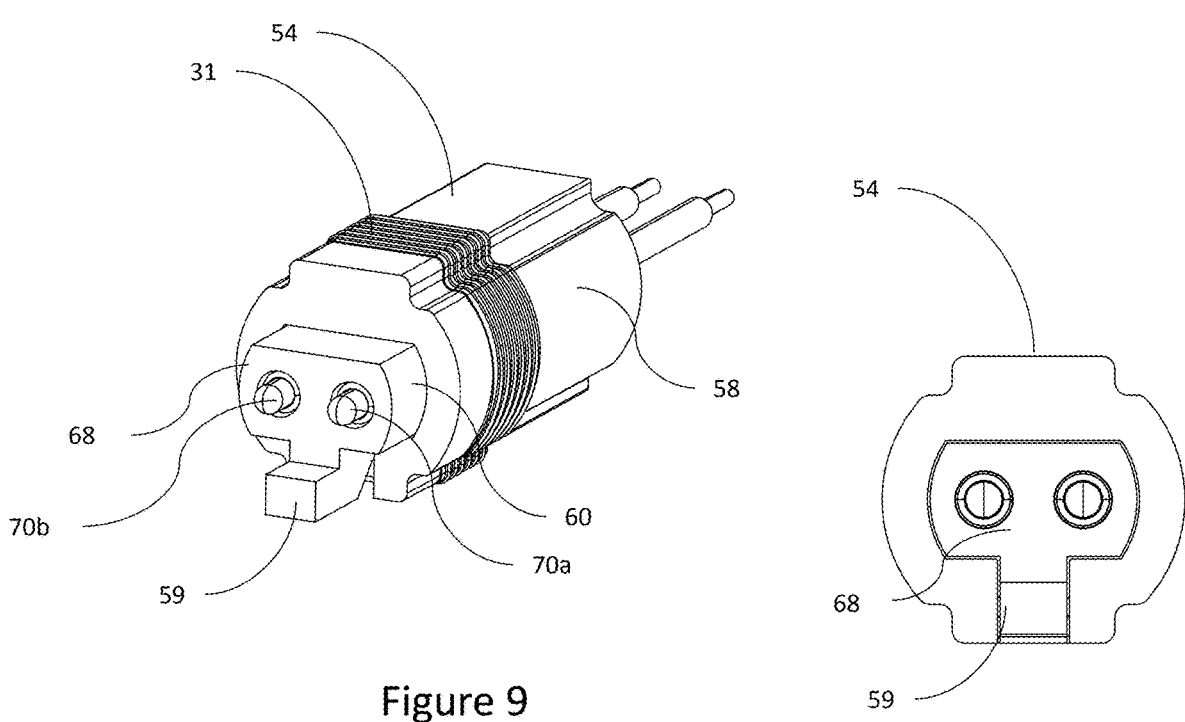
Figure 9
Figure 8
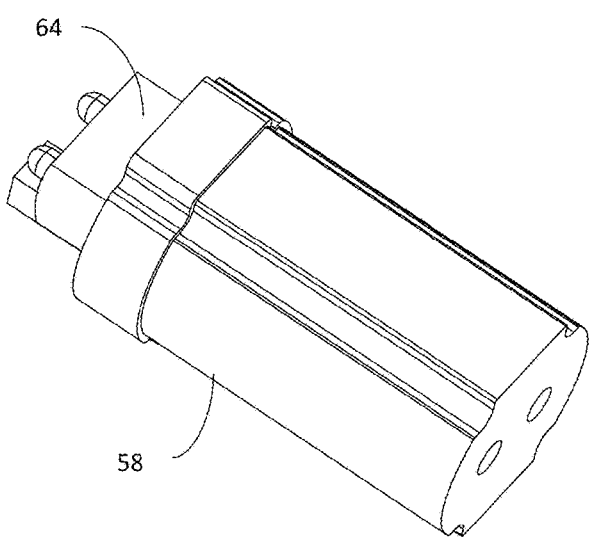
Figure 10

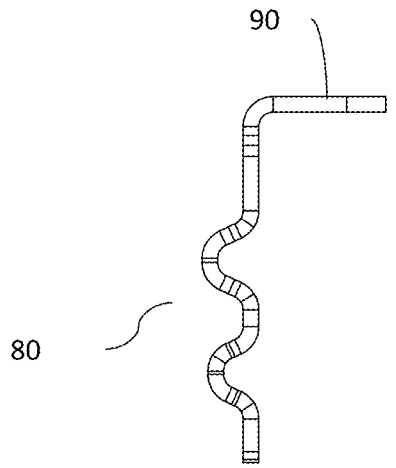
Figure 12a
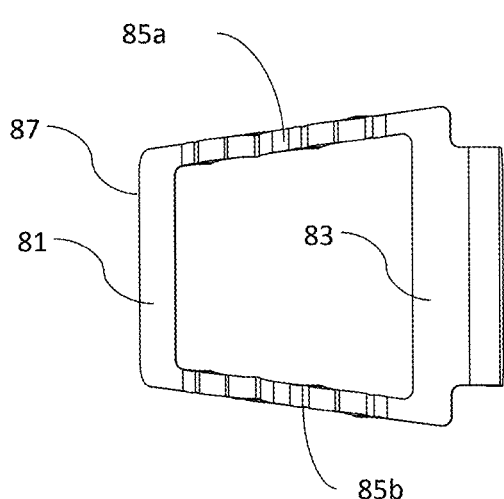
Figure 12b
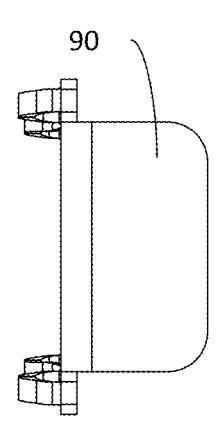
Figure 12c
Figure 12d

ELECTRICAL CONNECTOR ASSEMBLY

TECHNICAL FIELD

This disclosure relates to an electrical connector assembly, in particular but not exclusively, to a connector for connecting a light to a motorcycle fairing.

BACKGROUND

Numerous forms of electrical connector assemblies have been proposed over the years for providing a secure and constant electrical connection between parts that are subject to vibration and movement, such as automotive parts. Such connector assemblies can require significant force to connect and be overly complex in design.

SUMMARY

In accordance with an aspect of the invention there is provided an electrical connector assembly, comprising: a male connector comprising an insertion end having a latch receiving channel disposed in a bottom wall thereof and an electrical contact arrangement disposed on an engagement face; a female connector comprising: an open receiving end configured to receive the insertion end of the male connector; a movable member comprising an electrical contact arrangement disposed on an engagement face thereof and which is configured to move forwardly and rearwardly within the open receiving end, the movable member further comprising a gate that projects forwardly of the electrical contact arrangement and locates adjacent a bottom wall of the receiving end; a locking member having a latch portion locatable in a bottom latch channel disposed in the bottom wall of the receiving end; and wherein the movable member is forwardly biased by a biasing arrangement and such that, in the forwardly biased state, the latch portion of the lock is held captive in the bottom latch channel by the gate of the movable member; and wherein, for connection of the electrical connector assembly, the insertion end of the male connector is inserted into the open end of the female connector and such that, once the respective electrical contact arrangements have connected, continued insertion of the insertion end causes the movable member to move rearwardly, in turn causing the gate to move out of engagement with the latch portion allowing it to travel upwardly, by force of a locking member biasing arrangement, into a locked state received within the latch receiving channel of the male connector, thus preventing disengagement of the male connector from the female connector.

In an embodiment the latch portion connects to opposite side walls of the locking member so as to define an opening for receiving the insertion end of the male connector and wherein the side walls are configured to be slidingly received within corresponding opposite side channels defined in the open receiving end of the female connector.

In an embodiment the locking member biasing arrangement applies a biasing force sufficient to cause an audible noise to be heard as a result of the latch portion contacting an upper wall of the latch receiving channel of the male connector as it travels upwardly.

In an embodiment the side walls of the locking member meet with an actuator that extends upwardly through an opening in an upper wall of the open engagement end for overcoming the biasing of the biasing arrangement to push the latch portion downwardly into the bottom latch channel for releasing the male and female connectors.

In an embodiment the latch biasing arrangement comprises a spring which is disposed between the upper wall of the open engagement end and a portion of the actuator that extends generally parallel to the upper wall.

In an embodiment the assembly further comprises a boot that covers the actuator and which is configured to prevent ingress of fluid through the opening in the upper wall.

In an embodiment the moveable member is slidable within a housing and wherein the biasing arrangement comprises one or more compression springs disposed within the housing and which is/are configured to push the movable member away from a rear end of the housing. Once the latch portion is in the locked state, the compression spring(s) continues to apply a biasing force on the movable member to maintain the mated relationship between the respective electrical contact arrangements. Once the actuator has been depressed, the compression spring(s) pushes the movable member forwardly to thereby eject the male connector from the female connector. Once the compression spring(s) has pushed the movable member into the forward biased position, the gate is configured to impede the latch portion from returning to the locked state despite the upward biasing force applied by the latch biasing arrangement and such that it is reset ready for reconnection of the male and female connectors.

In an embodiment a body of the male connector comprises a bore defined therein and extending axially from the forward insertion end of the body to a rear securing end of the body and wherein the electrical contact arrangement is at least partially located within the bore.

In an embodiment the rear securing end comprises a threaded connector.

The electrical contact arrangement for one of the male or female connector may comprise a pair of inwardly extending pin receiving recesses disposed on the engagement face and wherein the complementary electrical contact arrangement on the other connector comprises a pair of spring loaded pins configured to be received within the pin receiving recesses for creating an electrical connection.

The electrical contact arrangement for one of the male or female connector may alternatively comprise an inwardly extending pin receiving recess disposed on the engagement face surrounded by an insulating ring which is in turn surrounded by an outer conducting ring and wherein the complementary electrical contact arrangement on the other connector comprises a spring loaded pin surrounded by an insulating ring which is in turn surrounded by an outer conducting ring, and wherein when the insertion end of the male connector is received within the open end of the female connector, the spring loaded pin locates in the inwardly extending pin receiving recess and the corresponding outer conducting rings bear upon one another for creating an electrical connection.

In an embodiment the electrical connector assembly is configured for electrically connecting a light housed within the female connector to a motorbike fairing.

In another aspect there is provided an electrical connector assembly, comprising: a male connector, female connector and locking arrangement for releasably locking the male and female connectors together, the male connector having a forward insertion end comprising an electrical contact arrangement disposed on a forward engagement face; the female connector comprising an open receiving end housing a movable member and being configured to receive the forward insertion end of the male connector, the movable member configured to move forwardly and rearwardly within the open receiving end and comprising an electrical contact arrangement disposed on a forward engagement face and wherein a gate of the movable member projects forwardly of the electrical contact arrangement and adjacent a bottom wall of the open receiving end; the locking arrangement comprising a locking clip having a bottom latch portion connected to opposite side walls that define an opening and wherein the bottom latch portion and opposite side walls are configured to be slidingly received within corresponding bottom and opposite side channels defined in the open receiving end of the female connector, and wherein the movable member is forwardly biased by a biasing arrangement and such that, in the forwardly biased state, the bottom latch portion is held captive in the bottom channel by the gate of the movable member; and wherein, for connection, the male connector is inserted into the female connector and such that, once the respective electrical contact arrangements have mated, continued insertion of the male connector into the female connector causes the movable member to move rearwardly, in turn causing the gate to move out of engagement with the latch portion allowing it to travel upwardly, by force of a locking clip biasing arrangement, into a locked state received within a channel defined in a bottom wall of the forward insertion end of the male member, thus preventing disengagement of the male connector from the female connector.

DESCRIPTION OF THE FIGURES

The accompanying drawings facilitate an understanding of the various embodiments:

FIGS. 8 through 10 are various views of a movable member and housing implemented by the electrical connector assembly of FIG. 1;

FIGS. 12a through 12d show various engineering views of a locking member implemented by the electrical connector assembly of FIG. 1;

DETAILED DESCRIPTION

Figure 1:
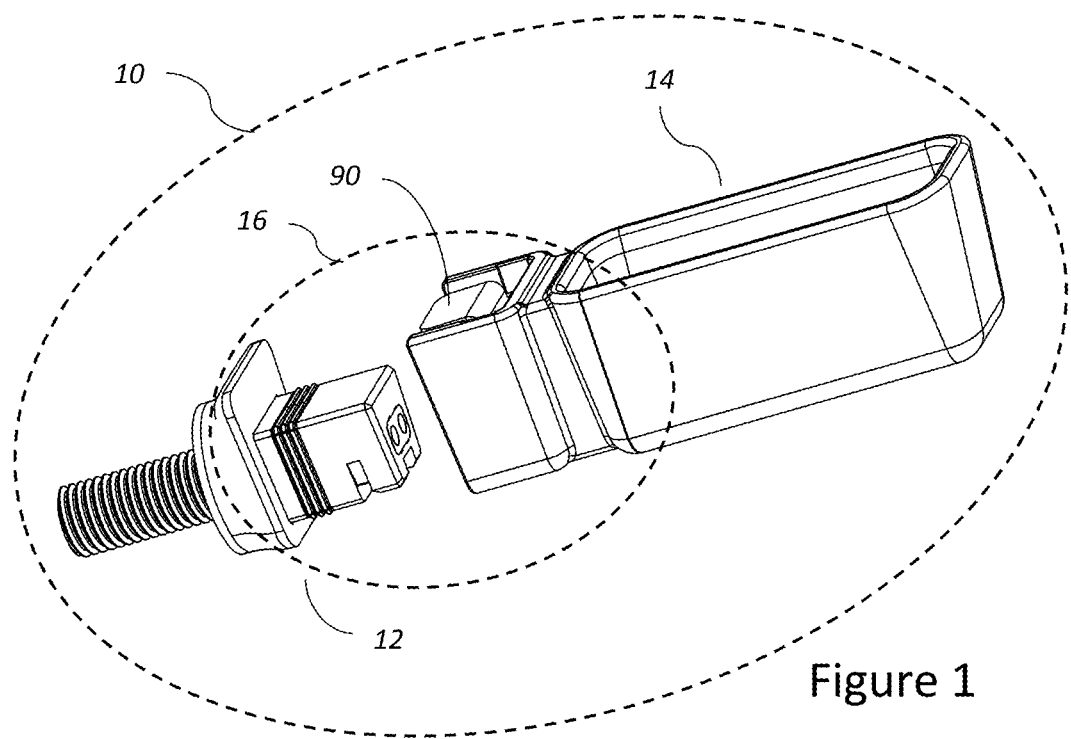
FIG. 1 is an exploded isometric front view of an electrical connector assembly in accordance with an embodiment.
Figure 2:
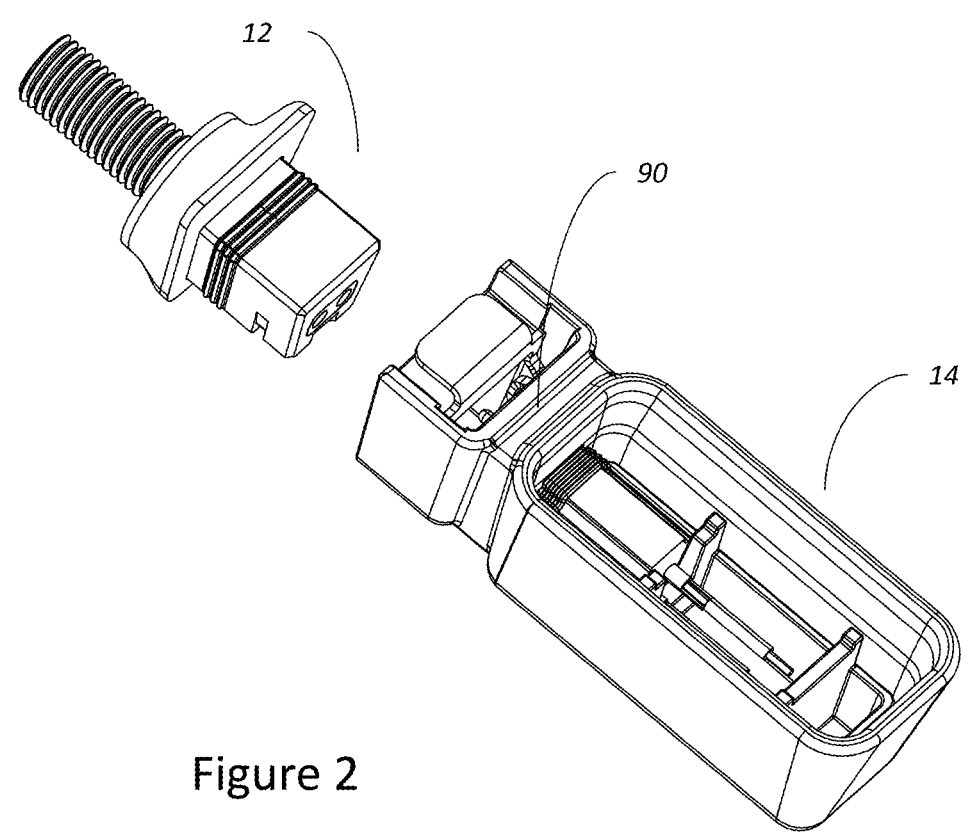
FIG. 2 is another exploded isometric view of the electrical connector assembly of FIG. 1.
Figure 3:
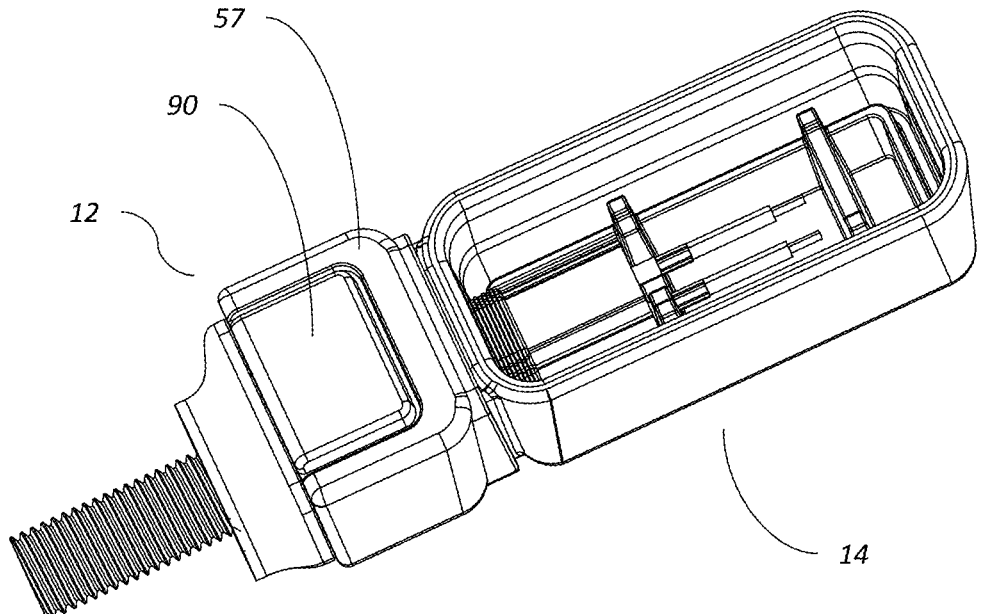
FIG. 3 is an isometric view showing the electrical connector assembly of FIG. 1 in an assembled/engaged state and additionally showing a protective boot.

With reference to FIG. 1, there is shown an exploded schematic view of an electrical connector assembly 10 comprising a male connector 12, a female connector 14 and a locking arrangement 16 for releasably locking the connectors together, in accordance with an embodiment of the invention. As will become evident from the subsequent description, a particular advantage of the electrical connector assembly 10 is that the male connector 12 and female connector 14 are configured to lockingly engage with an audible click that indicates that the two connectors 12, 14 are locked together. The connectors 12, 14 will remain mechanically locked until the user depresses a release actuator 90 (i.e., that forms part of the locking arrangement). Once the actuator 90 has been depressed, the male connector 12 and female connector 14 automatically separate from one another. If the male connector 12 is fixedly connected to a housing, for example, this will result in the female connector 14 being ejected into the user's hand (or vice versa if the female connector 14 is fixed). Further, depressing the actuator 90 will not only release the two connectors 12, 14, but also reset the locking arrangement 16 so that it is ready for re-connection. A further advantage of the electrical connector assembly 10 is that a portion of the locking arrangement 16 is configured to be automatically held out of the way until mating of the male and female connectors 12, 14 is complete. This not only improves user experience by reducing friction or resistance during mating of the two connectors 12, 14, but also facilitates relaxed manufacturing tolerances and the ability to configure the mating surfaces with other soft materials like o-rings, rubber gaskets or soft materials that would be damaged during mating of standard connectors. Other advantages are outlined at the end of this description.

Details of the male connector 12, female connector 14 and locking arrangement 16 will now be described. While the following description describes an electrical connector assembly 10 particularly configured for connecting a light housed within the female connector 14 to turn indicator circuitry of a motorcycle (i.e., such that the male connector 12 mounts to rigid fairing of a motorcycle with wiring from the indicator circuitry attached to electrical connectors of the male connector 12), it will be understood that embodiments are not so limited and the electrical connector assembly 10 could be used for connecting and disconnecting any two electrical components including lights, power sources, electrical controllers and the like.

Figure 4:
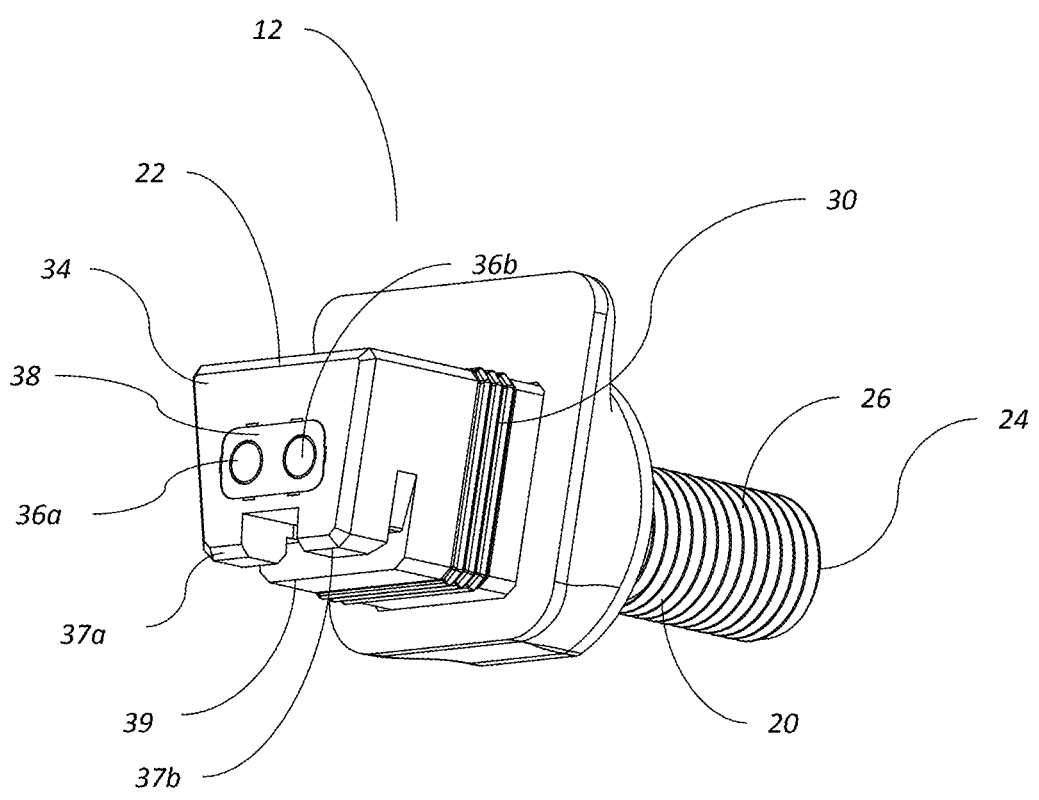
FIG. 4 is an isometric view of the male connector of FIG. 1.
Figure 5:
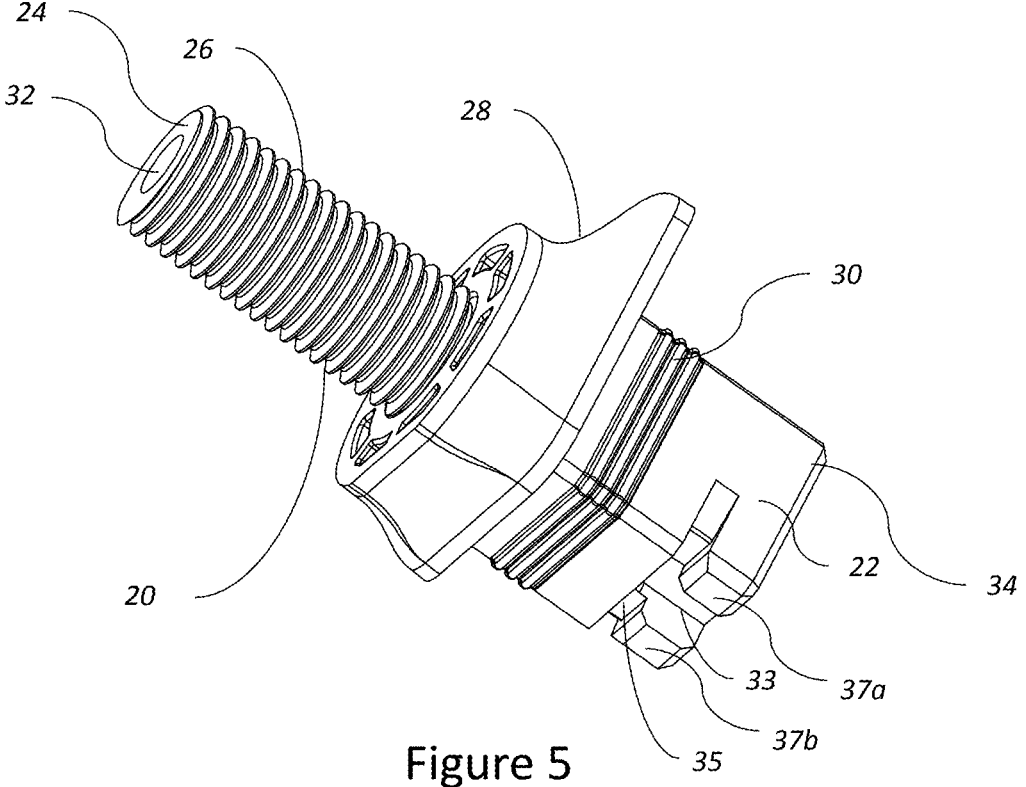
FIG. 5 is another isometric view of the male connector of FIG. 1.

As is particularly shown in FIGS. 4 and 5, the male connector 12 of the electrical connector assembly 10 is preferably formed from a combination of metal and plastic material. A body 20 of the electrical connector assembly 10 has a forward insertion end 22 and a rear securing end 24. According to the illustrated embodiment, the body 20 is formed from a single piece of metal. The rear securing end 24 comprises a threaded screw connector 26. A flanged portion 28 (in this case formed of plastic) is located over the screw connector 26 and has a bearing face that meets with the insertion end 22 (which is configured to be inserted within the female connector 14). A bore 32 extends axially from the insertion end 22 of the body 20 to the rear securing end 24.

An axially aligned channel 33 (hereafter "gate receiving channel" for reasons that will become evident in subsequent paragraphs) is defined in a forward portion of a bottom wall 39 of the insertion end 22. The gate receiving channel 33 extends from a male forward engagement face 34 and joins with a transversely aligned latch receiving channel 35 (i.e., extending from opposite side walls of the insertion end 22), again for reasons that will become evident in subsequent paragraphs. Together, the channels 33, 35 create separate bottom wall portions 37*a*, 37*b* having chamfered forward rear and outer edges.

A male electrical contact arrangement is located within the bore 32 and extends to the male forward engagement face 34 of the male connector 12. According to the illustrated embodiment, the male electrical contact arrangement comprises pin receiving recesses 36*a*, 36*b* disposed on the male forward engagement face 34. The pin receiving recesses 36*a*, 36*b* are surrounded by an insulating panel 38. Wires extending into the bore 32 from the rear securing end 24 connect to respective conducting ends of the pin receiving recesses 36*a*, 36*b* (e.g., by a solder connection or any suitable electrical connector).

According to the illustrated embodiment, the cross-sectional profile of the insertion end 22 takes the shape of an isosceles trapezium, although persons skilled in the art will understand that this may vary depending on the desired aesthetics and form factor. For example, in one alternative embodiment, the cross-sectional profile could be oval shaped.

The screw connector 26 may be inserted into an opening defined in a wall, such as a motorcycle fairing, to which the female connector 14 is to be connected. Accordingly, the shape of the flanged portion 28 adjacent the screw connector 26 may vary (e.g., to suit different fairings). The opening may include a corresponding thread allowing the male connector 12 to be screwed into the wall. Otherwise, a nut may be used to fasten the male connector 12 to the wall (i.e., from the other side of the wall). It will be understood that the rear end may be differently configured and rather than being in the form of a screw connector may instead comprise a fastening mechanism not limited to a clip, locking fastener, press-fit fastener or other suitable fastening arrangement.

Figure 6A:
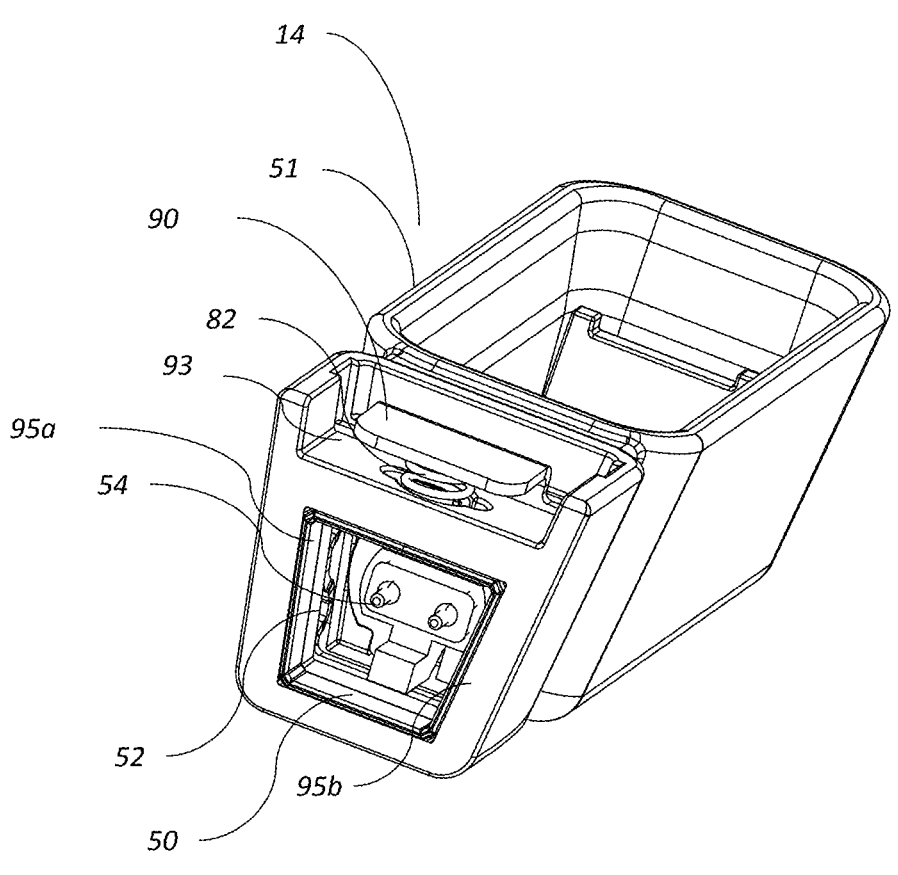
FIG. 6a is an isometric view of the female connector of FIG. 1.
Figure 6B:
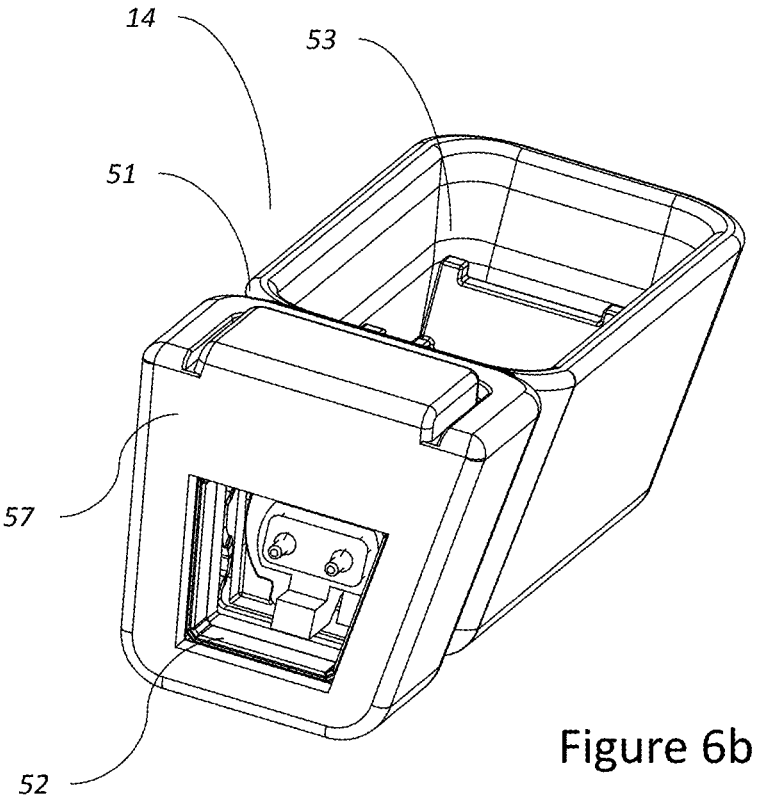
FIG. 6b is the same isometric view as FIG. 6a additionally showing the protective boot.
Figure 7:
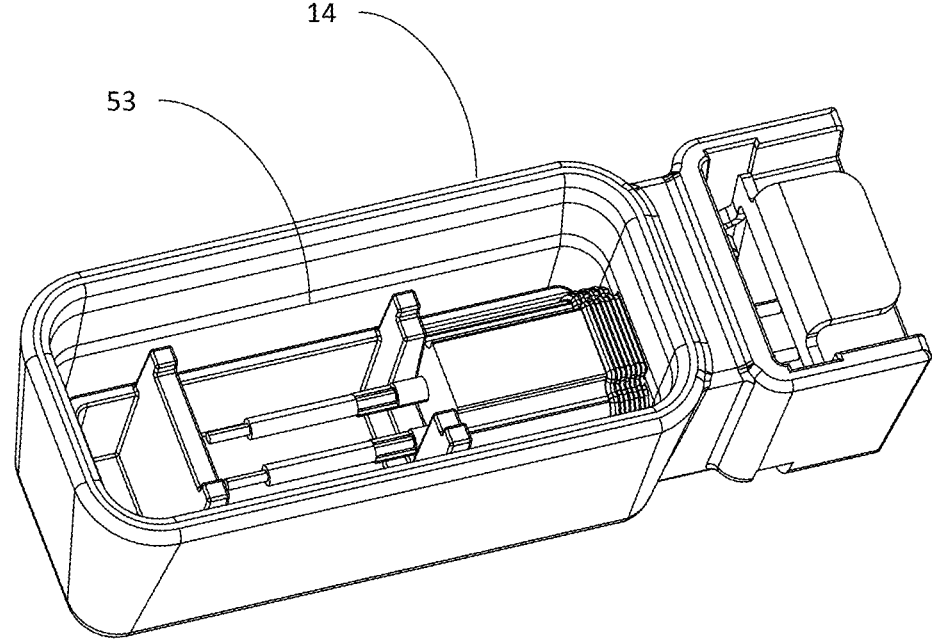
FIG. 7 is another isometric view of the female connector of FIG. 1.
Figure 11:
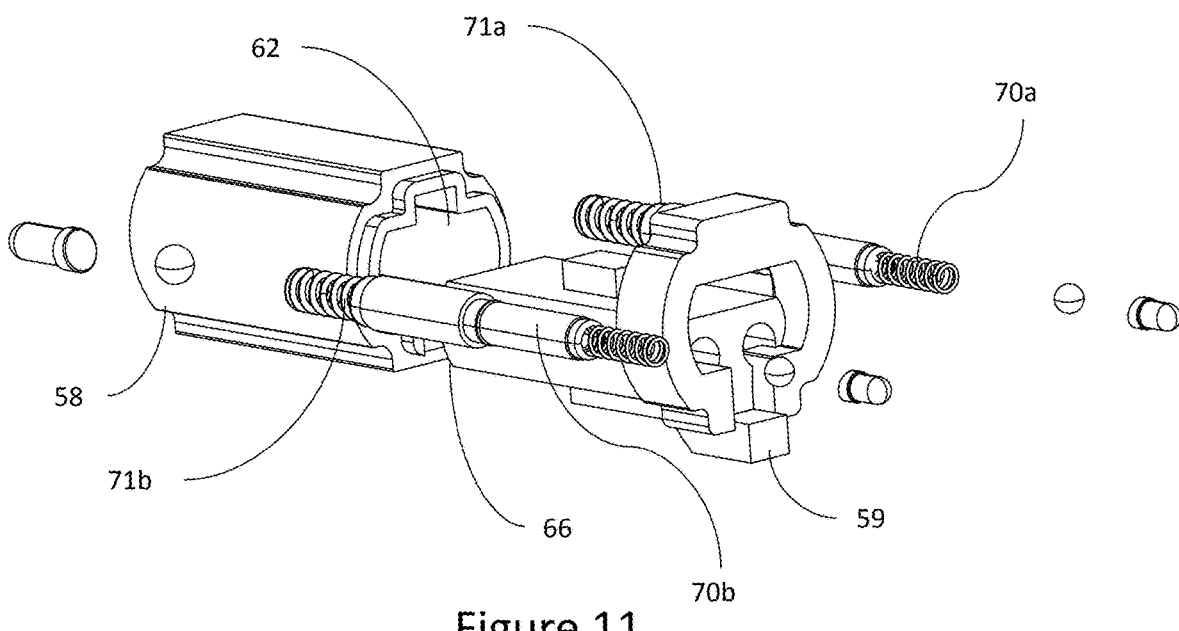
FIG. 11 is an exploded view of the movable member and housing.

With reference to FIGS. 6*a*, 6*b* and 7, the female connector 14 comprises a body 51 (in this case formed of a metal material, though other suitable materials or combinations of materials including plastics could equally be used depending on the desired implementation) having a forwardly disposed open receiving end 52 and a rear component end 53 for housing electrical/electronic component(s), such as a motorcycle light. FIG. 6*b* additionally shows a rubber boot 57 disposed over the open receiving end 52. The open receiving end 52 is configured to receive the insertion end 22 of the male connector 12 and as such has a generally complimentary inner wall profile. When so received, the male forward engagement face 34 of the male connector 12 is configured to make electrical contact with a complementary female electrical contact arrangement 54 of the female connector 14 as will be described below (and as visually illustrated in FIGS. 14 to 16).

As particularly shown in FIGS. 8 through 11, the female electrical contact arrangement 54 comprises a movable member 60 that locates within a guide shaft 62 defined in a housing 58. The housing is press fitted into, or otherwise securely locates within, a rear wall of the receiving end 52 of the female connector 14. The movable member 60 has a forward end 64 (on which is disposed a female forward engagement face 68) and rear end 66. The forward end 64 is slidably received within a forward portion of the guide shaft 62, allowing it to move forwardly and rearwardly within the open end 52.

Figure 14:
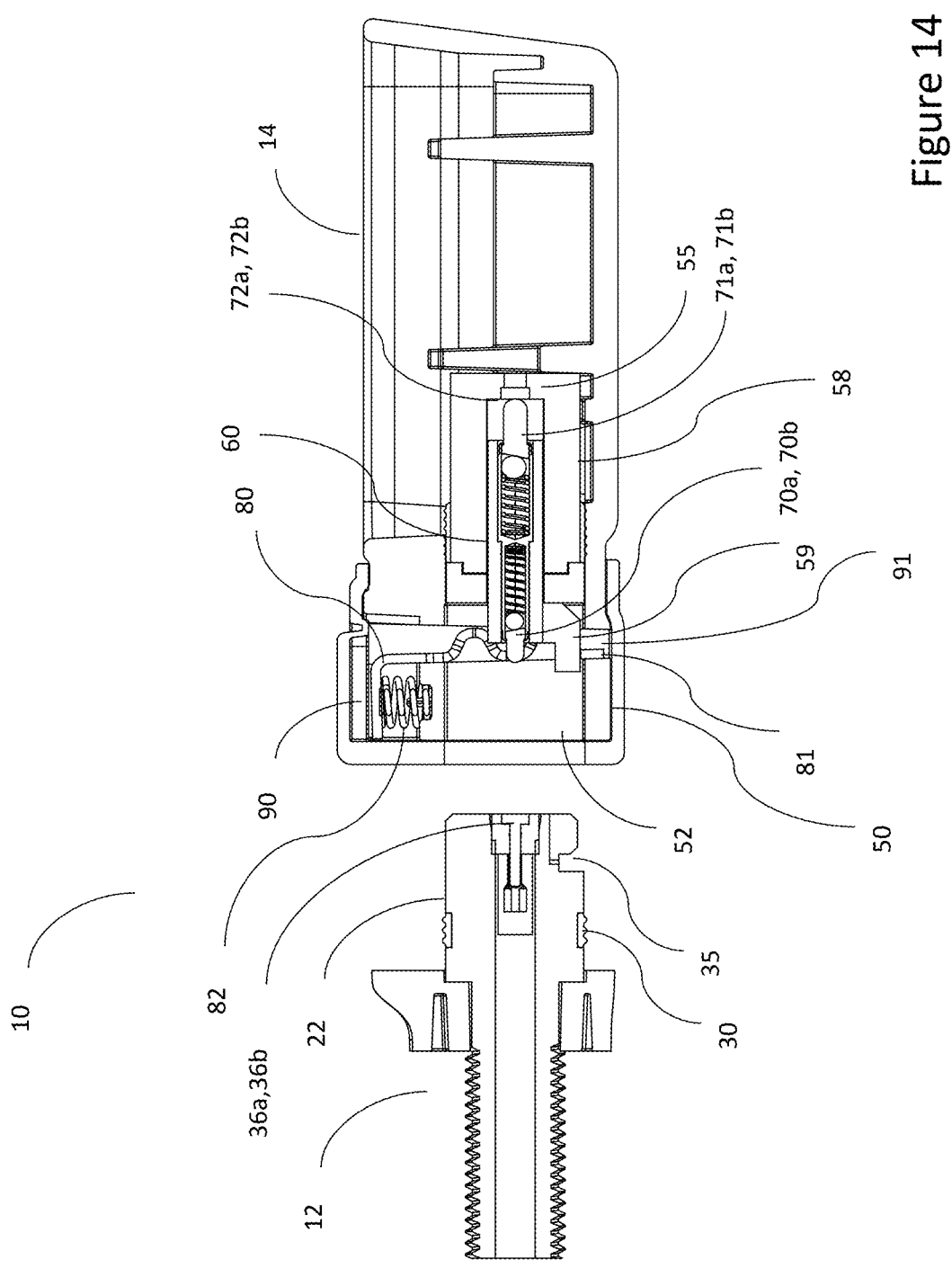
FIG. 14 is a sectional schematic of the electrical connector assembly illustrating the female connector in an unlocked and ready-to-connect state.

An electrical contact arrangement complementary to that found on the male connector 12 is disposed on the female forward engagement face 68 of the movable member 60. More particularly, the electrical contact arrangement comprises a pair of forwardly projecting spring-loaded pogo pins 70*a*, 70*b* that are configured to locate in the pin receiving recesses 36*a*, 36*b* of the male connector 12 for making electrical contact. The spring loaded pins 70*a*, 70*b* have contact ends disposed in the movable member 60 which are electrically coupled to corresponding spring loaded pogo pins 71*a*, 71*b* disposed in the rear end 66 of the movable member 60. The spring loaded pins 71*a*, 71*b* are in turn configured to locate in pin receiving recesses 72*a*, 72*b* defined in an interior rear wall 55 of the housing 58 for electrical connection (e.g., by way of wires that are soldered or otherwise electrically connected to conducting terminals of the recesses 72*a*, 72*b*, or via direct electrical connection thereto) to a light or other electrical component to be housed in the rear component end 53 of the female connector 14. This is best shown in FIG. 14.

A biasing arrangement is provided for forwardly biasing the movable member 60. According to the illustrated example, this is achieved by way of the spring loaded pogo pins 71*a*, 71*b* that are in constant contact with, and thus configured to apply a constant pushing force against, the pin receiving recesses 72*a*, 72*b* disposed on the interior rear wall of the housing 58. In an alternative embodiment, the female electrical contact arrangement 54 may employ a compression spring located within a rear portion of the guide shaft (i.e., such that a first end of the compression spring abuts the interior rear wall of the housing 58 and an opposite second end bears against a portion of the movable member 60). Further, it will be understood that the shape of the movable member 60 and guide shaft 62 may be different to that shown in the illustrated example, while still achieving the forwardly biased slidable function.

A gate 59 of the movable member 60 projects forwardly of the female forward engagement face 68 and, in use, is configured to locate within the axially aligned channel 33 of the male connector 12 (and thus has a complimentary cross-sectional profile). As is evident from FIGS. 15 to 17, the gate 59 locates adjacent a bottom wall 50 of the receiving end 52 of the female connector 14.

Figure 13:
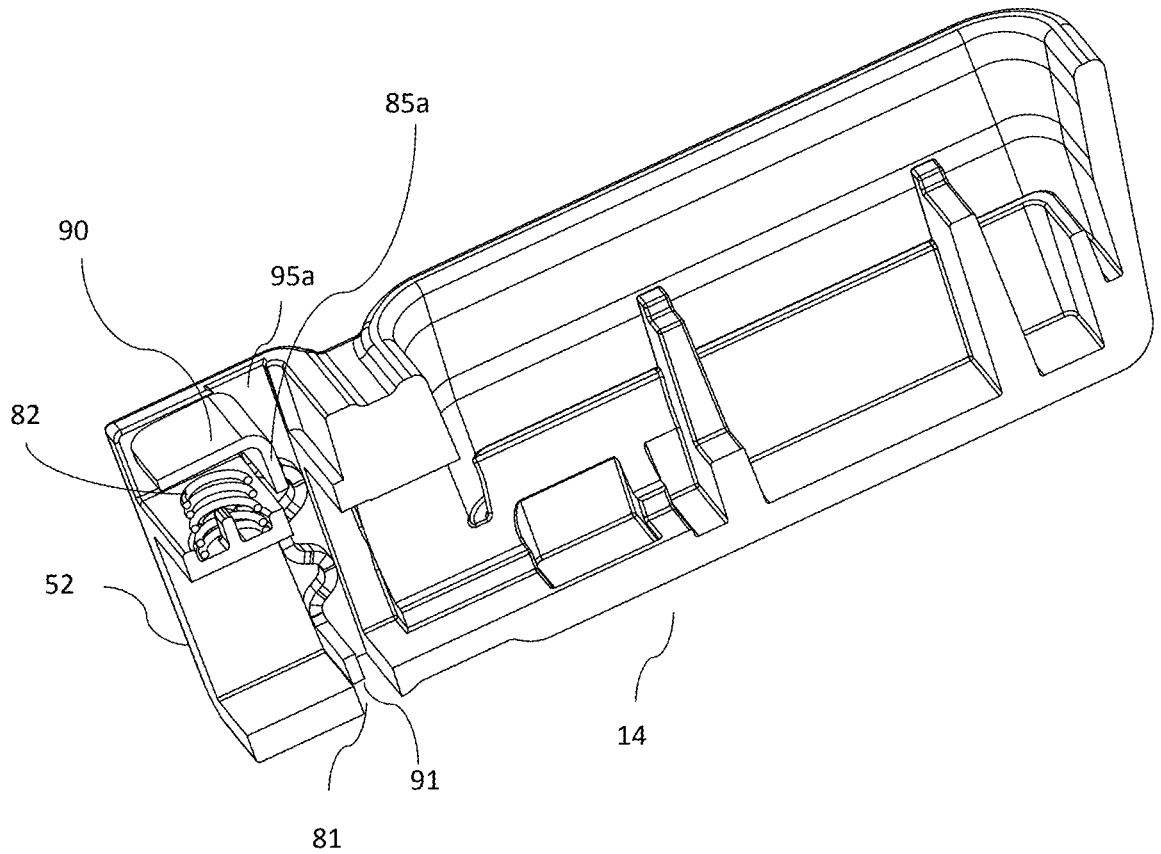
FIG. 13 is a sectional schematic of the female connector illustrating positioning of the locking member.

With reference to FIGS. 12 through 16, the locking arrangement comprises a locking member in the form of a locking clip 80 locatable within the open end 52 of the female connector 14. As is best shown in FIGS. 12*a* to 12*d*, the locking clip 80 comprises a bottom wall 81, top wall 83 and opposite side walls 85*a*, 85*b* that define an opening for receiving a forward portion of the male connector 12. The bottom and opposite side walls 81, 85*a*, 85*b* are configured to be slidingly received within corresponding bottom and opposite side channels defined in the open end 52 of the female connector 14 (FIG. 13 is a cross sectional view of the female connector 14 sans female electrical contact arrangement 54, showing a left channel 95*a* and a portion of the bottom channel 91 (hereafter "bottom latch channel")—it will be understood that the bottom latch channel 91 extends into a right channel 95*b* which is the mirror opposite of the left channel as per FIG. 6*a*). An upper actuating portion 90 of the locking clip 80 extends upwardly and out a slot 93 in the upper wall of the receiving end 52. The upper actuating portion 90 can be pressed by a user to overcome a bias of a locking member biasing spring 82. According to the illustrated embodiment, the locking member biasing spring 82 locates over a protrusion and is held captive between the upper actuating portion 90 and upper wall of the receiving end 52 of the female connector 14. As will be described in more detail below, the bottom wall 81 of the locking clip 80 operates as a latch and will hereafter be referred to as such (i.e., "latch 81"). When the upper actuating portion 90 is fully depressed the latch 81 seats within the bottom latch channel 91, thereby allowing the gate 59 to travel over and hold the latch 81 captive.

As shown in FIGS. 6*b* and 14 to 16, a rubber boot 57 is configured to extend around the forward face of the female connector 14 and extend over the upper actuating portion 90. In addition, rubber seals 30, 31 may be circumferentially disposed over the insertion end 22 of the male connector 12 and housing 58 of the movable member 60 for preventing ingress of dirt or fluid into the receiving end 52 of the female connector 14 when the male and female connectors 12, 14 are mated. The rubber seal 30 also operates to eliminate machining tolerances and helps stabilise the male connector within the female connector 14.

Locking and unlocking operation of the electrical connector assembly 10 will now be described.

With reference to FIG. 14, in a non-connected state, the movable member 60 is forwardly biased by the biasing arrangement. In this forwardly biased state, the gate 59 is in a sprung out position trapping the latch 81 in the bottom latch channel 91 (and such that the latch 81 bears upwardly against the gate 59 by virtue of the locking member biasing spring 82).

For connection, the insertion end 22 of the male connector 12 is inserted into the open receiving end 52 of the female connector 14. During this initial insertion, the latch 81 of the locking clip 80 continues to be held captive by the gate 59 and thus provides no mechanical mating resistance.

Figure 15:
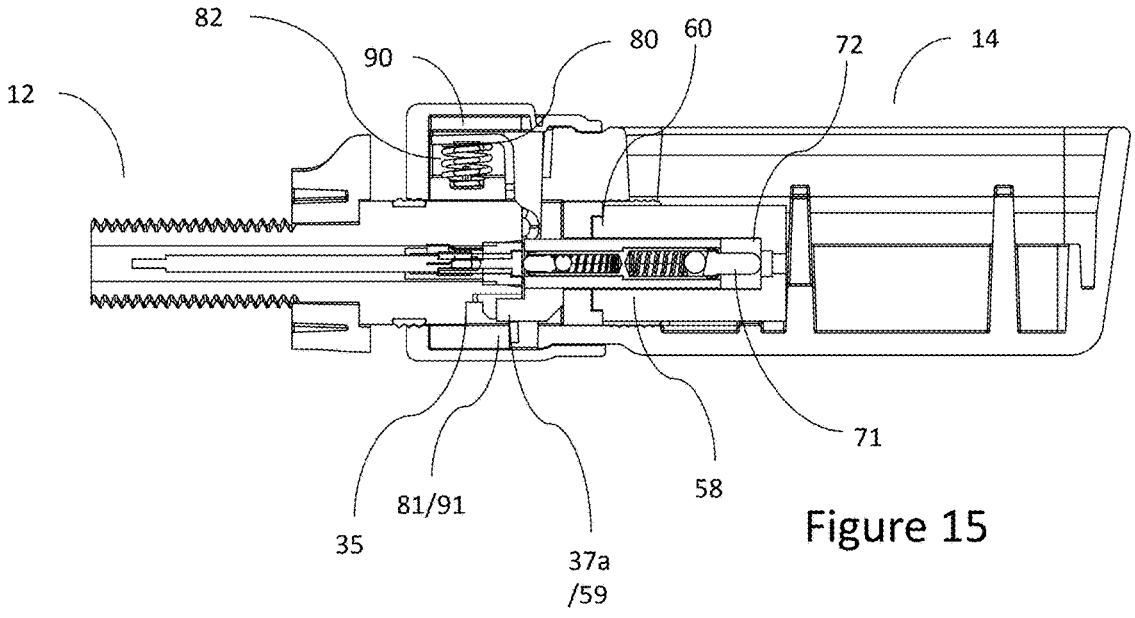
FIG. 15 is a sectional schematic illustrating partial insertion of the male connector into the female connector.
Figure 16:
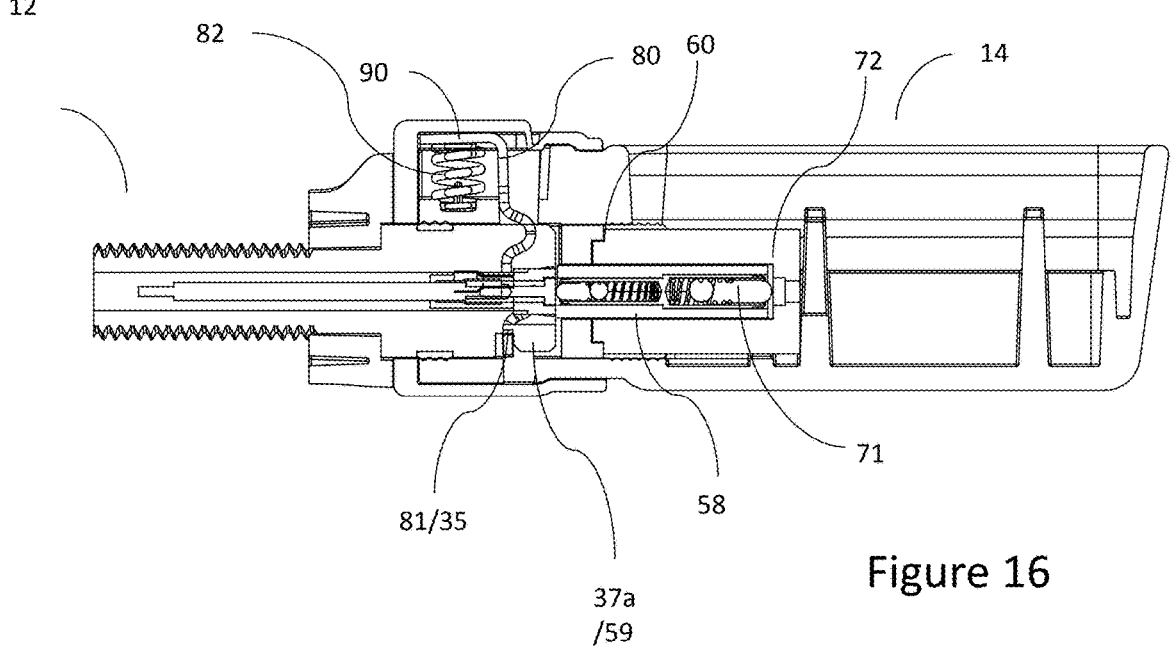
FIG. 16 is a sectional schematic illustrating full insertion and locking of the male connector into the female connector.

Once the electrical contact arrangement of the male connector 12 has mated with the electrical contact arrangement of the female connector 14, continued insertion causes the springs of the pogo pins 71*a*, 71*b* to compress and thereby retract the gate 59 which in turn frees the latch 81, allowing it to travel upwardly, by force of the locking member biasing spring 82, into a locked state (i.e., with the latch 81 being received and held captive within the latch receiving channel 35 defined in the insertion end 22 of the male connector 12), thus preventing disengagement of the male and female connectors 12, 14. The force of the latch 81 contacting the latch receiving channel 35 of the male connector 14 causes a loud and tactile (haptic) click to occur. In addition, it will be appreciated that once mated, the biasing arrangement continues to apply a biasing force on the male connector forcing it slightly back (i.e., such that the latch receiving channel 35 constantly pushes against a side wall of the latch 81), thereby assisting to stabilise and better hold the male and female connectors 12, 14 together. The rubber boot 57 also assists in reducing vibration by virtue of the forward rubberised wall. Specifically, when the user inserts the male connector 12 within the open receiving end 52 of the female connector 14, the forward wall of the rubber boot 57 compresses slightly, thereby allowing the forward wall of the flange 28 (and thus insertion end 22) to push forward enough to allow the female electrical contact arrangement 54 to retract and lock, then relax as the biasing arrangement pushes back on the movable member 60, creating a snug fit between the forward facing wall of the flange 28 and the forward wall of the open end 52. The above sequence of events is best shown in FIGS. 15 and 16.

The locking clip 80 keeps the two connectors 12, 14 mated until the actuator 90 is pressed. When the actuator 90 is subsequently pressed (i.e., such that the latch 81 travels down and locates back within the bottom latch channel 91 and in turn releasing the male connector 12 from the locked state), the movable member 60 is free to spring forward causing the male connector 12 to be pushed out of the open end 52. At the same time, the forward movement of the movable member 60 causes the latch 81 to be recaptured by the gate 59 to thereby maintain the locking clip 80 in the unlocked state (i.e., as per FIG. 14). Thus, this action automatically (and unbeknownst to the user) resets the assembly when they press the actuator 90. The user only sees the two connectors 12, 14 separating, unaware that the locking clip 80 has been spring-loaded in the unlocked and ready state.

Figure 17:
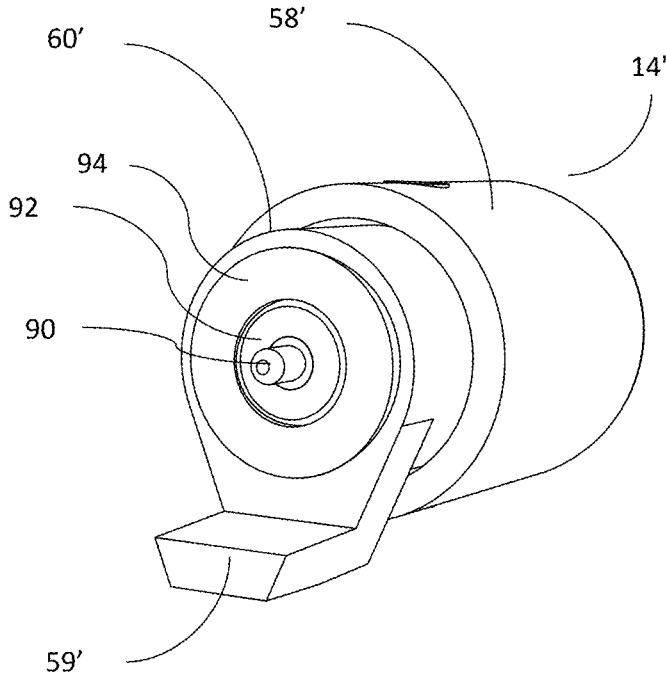
FIG. 17 is an alternative example embodiment of a female electrical connector.
Figure 18:
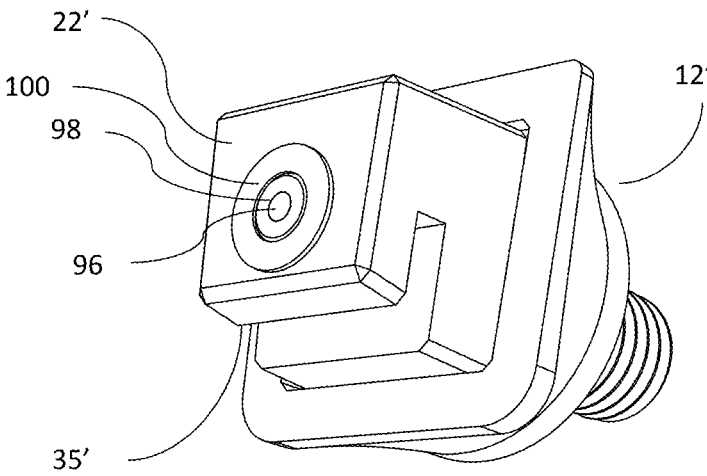
FIG. 18 is an alternative example embodiment of male electrical connector.

It will be understood that any suitable electrical contact arrangement for the male and female connectors could be employed for use with the connector assembly 10 and that the dual spring pin arrangement described above should not be seen as limiting. By way of example, as shown in FIGS. 17 and 18, rather than employing a pair of pin connectors, the contact arrangement may instead employ a single spring loaded pin. In this case, the female connector 14' comprises a single spring loaded pin 90, surrounded by an insulating ring 92, which is in turn surrounded by an outer conducting ring 94. Correspondingly, the male connector 12' employs an inwardly extending pin receiving recess 96 surrounded by an insulating ring 98, which is in turn surrounded by an outer conducting ring 100 (i.e., such that for making electrical contact the pin 90 is received within the recess 96 with the outer conducting rings 94, 100 bearing upon one another). Further, as shown, the insertion end 22' of the male connector 12' may have an inwardly stepped forward end defining a single channel 35' configured to travel over the gate 59 and obviating the need for an axial channel as per the embodiment shown in FIGS. 1 to 16. It will also be understood that the electrical contacts could take the form of any suitable contact or terminal such as compression connectors, spring battery connectors, magnetic connectors, piston, header, cylindrical or any other suitable electrical mating contact. All these alternative electrical connector/contact configurations, and indeed any suitable connector/contact configuration, is within the purview of the skilled addressee.

It will be appreciated that the afore-described connector assembly 10 provides various advantages over conventional designs. One particular advantage is that the two mating connectors 12, 14 are configured to automatically lock together and such that the locking arrangement produces an audible click once so locked. The connectors 12, 14 will remain mechanically locked and electrically connected until the user depresses the actuator 90. Once the actuator has been depressed, the male connector 12 will automatically eject outwardly from the assembly 10. If the male connector 12 is fixedly connected to a housing, this will result in the female connector 14 being ejected into the user's hand. Further, the locking arrangement of the present invention does not scrape, wear or damage paint, plastics, or coatings on metal (as is the case for many conventional designs), since the locking clip does not spring into the locked position until the male and female connectors are fully mated. When the user depresses the release actuator they also unknowingly load and lock the locking arrangement into the open position for the next mating cycle. The force required to lock the connectors 12, 14 is minimal relative to commercially available locking connectors. This assembly also resolves issues involving mechanical over constraint improving manufacturability through relaxed and achievable manufacturing tolerances.

Other advantages of this apparatus include but are not limited to an optimized minimal footprint and the ability to seal the connection from dirt, moisture, and other contamination. It is also capable of maintaining an electrical connection in high vibration settings.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "forward" and "rearward", "upper" and "lower", "above" and "below", "top" and "bottom" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

The preceding description is provided in relation to several embodiments which may share common characteristics and features. It is to be understood that one or more features of any one embodiment may be combinable with one or more features of the other embodiments. In addition, any single feature or combination of features in any of the embodiments may constitute additional embodiments.

In addition, the foregoing describes only some embodiments of the inventions, and alterations, modifications, additions and/or changes can be made thereto without departing from the scope and spirit of the disclosed embodiments, the embodiments being illustrative and not restrictive.

Furthermore, the inventions have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the inventions. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

The invention claimed is:

1. An electrical connector assembly, comprising:
a male connector comprising an insertion end having a latch receiving channel disposed in a bottom wall thereof and an electrical contact arrangement disposed on an engagement face of the male connector;
a female connector comprising:
an open receiving end configured to receive the insertion end of the male connector;
a movable member comprising an electrical contact arrangement disposed on an engagement face thereof and which is configured to move forwardly and rearwardly within the open receiving end, the movable member further comprising a gate that projects forwardly of the electrical contact arrangement and locates adjacent a bottom wall of the receiving end;

a locking member having a latch portion locatable in a bottom latch channel disposed in the bottom wall of the receiving end; and
wherein the movable member is biased toward the open receiving end of the female connector in a forwardly biased state by a movable member biasing arrangement and such that, in the forwardly biased state, the latch portion of the locking member is held captive in the bottom latch channel by the gate of the movable member; and
wherein, for connection of the electrical connector assembly, the insertion end of the male connector is inserted into the open end of the female connector and such that, once the respective electrical contact arrangements have connected, continued insertion of the insertion end causes the movable member to move rearwardly away from the open receiving end of the female connector, in turn causing the gate to move out of engagement with the latch portion allowing it to travel upwardly, by force of a locking member biasing arrangement, into a locked state received within the latch receiving channel of the male connector, thus preventing disengagement of the male connector from the female connector.

2. An electrical connector assembly in accordance with claim 1, wherein the latch portion connects to a pair of opposing side walls of the locking member so as to define an opening for receiving the insertion end of the male connector and wherein the opposing side walls are configured to be slidingly received within corresponding opposite side channels defined in the open receiving end of the female connector.

3. An electrical connector assembly in accordance with claim 2, wherein the locking member biasing arrangement applies a biasing force sufficient to cause an audible noise to be heard as a result of the latch portion contacting an upper wall of the latch receiving channel of the male connector as it travels upwardly.

4. An electrical connector assembly in accordance with claim 3, wherein the opposing side walls of the locking member meet with an actuator that extends upwardly through an opening in an upper wall of the open engagement end for overcoming the biasing of the locking member biasing arrangement to push the latch portion downwardly into the bottom latch channel for releasing the male and female connectors.

5. An electrical connector assembly in accordance with claim 4, wherein the locking member biasing arrangement comprises a spring which is disposed between the upper wall of the open engagement end and a portion of the actuator that extends generally parallel to the upper wall.

6. An electrical connector assembly in accordance with claim 4, further comprising a boot that covers the actuator and which is configured to prevent ingress of fluid through the opening in the upper wall.

7. An electrical connector assembly in accordance with claim 4, wherein the moveable member is slidable within a housing and wherein the movable member biasing arrangement comprises one or more compression springs disposed within the housing and which is/are configured to push the movable member away from a rear end of the housing.

8. An electrical connector assembly in accordance with claim 7, wherein once the latch portion is in the locked state, the compression spring(s) continues to apply a biasing force on the movable member to maintain the mated relationship between the respective electrical contact arrangements.

9. An electrical connector assembly in accordance with claim 8, wherein once the actuator has been depressed, the compression spring(s) pushes the movable member forwardly to thereby eject the male connector from the female connector.

10. An electrical connector assembly in accordance with claim 8, wherein once the compression spring(s) has pushed the movable member into the forwardly biased state, the gate is configured to impede the latch portion from returning to the locked state despite the upward biasing force applied by the locking member biasing arrangement and such that it is reset ready for reconnection of the male and female connectors.

11. An electrical connector assembly in accordance with claim 1, wherein a body of the male connector comprises a bore defined therein and extending axially from the insertion end of the male connector to a securing end of the body and wherein the electrical contact arrangement of the male connector is at least partially located within the bore.

12. An electrical connector assembly in accordance with claim 11, wherein the securing end comprises a threaded connector.

13. An electrical connector assembly in accordance with claim 11, wherein the electrical contact arrangement for one of the male or female connector comprises a pair of inwardly extending pin receiving recesses disposed on the engagement face and wherein the complementary electrical contact arrangement on the other connector comprises a pair of spring loaded pins configured to be received within the pin receiving recesses for creating an electrical connection.

14. An electrical connector assembly in accordance with claim 11, wherein the electrical contact arrangement for one of the male or female connector comprises an inwardly extending pin receiving recess disposed on the engagement face surrounded by an insulating ring which is in turn surrounded by an outer conducting ring and wherein the complementary electrical contact arrangement on the other connector comprises a spring loaded pin surrounded by an insulating ring which is in turn surrounded by an outer conducting ring, and wherein when the insertion end of the male connector is received within the open end of the female connector, the spring loaded pin locates in the inwardly extending pin receiving recess and the corresponding outer conducting rings bear upon one another for creating an electrical connection.

15. An electrical connector assembly in accordance with claim 1, wherein the electrical connector assembly is configured for electrically connecting a light housed within the female connector to a motorbike fairing.

* * * * *